United States Patent [19]
Haak et al.

[11] Patent Number: 4,813,480
[45] Date of Patent: Mar. 21, 1989

[54] APPARATUS FOR COOLING DUST OR FINELY GRANULAR BULK MATERIAL

[75] Inventors: Wolfgang Haak, Oelde; Bernd Kirchhoff; Ulrich Binder, both of Ennigerloh, all of Fed. Rep. of Germany

[73] Assignee: O&K Orenstein & Koppel Aktiengesellschaft, Dortmund, Fed. Rep. of Germany

[21] Appl. No.: 937,936

[22] Filed: Dec. 4, 1986

[30] Foreign Application Priority Data

Dec. 13, 1985 [DE] Fed. Rep. of Germany ....... 3544075

[51] Int. Cl.⁴ .............................................. F24H 3/02
[52] U.S. Cl. ..................................... 165/120; 165/96; 165/134.1
[58] Field of Search ............... 165/120, 96, 120, 134.1

[56] References Cited

U.S. PATENT DOCUMENTS

| | | | |
|---|---|---|---|
| 2,900,239 | 8/1959 | Speed et al. | 165/120 X |
| 2,917,284 | 12/1959 | Christian | 165/120 |
| 2,943,845 | 7/1960 | Jaklitsch | 165/120 X |
| 4,039,024 | 8/1977 | List | 165/120 X |
| 4,667,731 | 5/1987 | Baumgartner et al. | 165/134.1 X |

FOREIGN PATENT DOCUMENTS

| | | | |
|---|---|---|---|
| 425384 | 2/1926 | Fed. Rep. of Germany | 165/120 |
| 1130582 | 3/1962 | Fed. Rep. of Germany | 165/120 |
| 1601213 | 6/1970 | Fed. Rep. of Germany | . |
| 2557774 | 11/1980 | Fed. Rep. of Germany | . |
| 516022 | 12/1939 | United Kingdom | . |

Primary Examiner—Ira S. Lazarus
Assistant Examiner—Peggy Neil
Attorney, Agent, or Firm—Martin A. Farber

[57] ABSTRACT

An apparatus for the cooling of dust or finely granular bulk material, having a vertical cylindrical cooling jacket, the externally cooled cylindrical surface of which is fed with the material to be cooled from the inside by means of an annular conveyor worm which conducts the material upward and presses it by centrifugal force against the heat exchange surface. In order to be able to materials which are subject to explosion safely with the apparatus, the conveyor worm is arranged on the cylindrical surface of a cylindrical hollow body which is closed at its ends, fills the greatest part of the inside of the cooling jacket, and is driven by a motor.

11 Claims, 2 Drawing Sheets

APPARATUS FOR COOLING DUST OR FINELY GRANULAR BULK MATERIAL

FIELD AND BACKGROUND OF THE INVENTION

The present invention relates to an apparatus for cooling dust or finely granular bulk material, having a vertical cylindrical cooling jacket, the externally cooled cylindrical surface of which is fed with the material to be cooled from the inside by means of an annular conveyor worm which conducts the material upward and presses it by the centrifugal force against the heat exchange surface, the conveyor worm which is turnable about a central axis being driven by a motor.

Cooling devices of the type described above are known, in particular for the cooling of cement and cement grit. The material to be cooled is fed to the cylindrical container from below through an inlet connection, taken up by the worm threads which are rotating at high speed, thrown slung against the wall of the container and, at the same time, conveyed upward towards the outlet opening. During this conveying process, cooling water flows down on the outer wall of the container which is preferably divided into sectors, and cools the wall and thus indirectly the material, the material giving off its heat by contact with the container wall. The heated cooling water flows back into a cooling system where it is again cooled down to the required temperature.

The advantages of such a cooling device consist in the fact that within only a relatively small space an effective cooling of the fine material is obtained. The formation of a crust by condensation is substantially prevented by the rotating conveyor worm. The cooling device is therefore also suitable for the cooling of slaked lime, coal fines and fertilizers.

Since dust and finely granular bulk material are subject to explosion at a certain concentration of dust in case a spark or incandescent pockets are formed, the known cooling device cannot be used, for instance, for coal dust or other explosive substances.

SUMMARY OF THE INVENTION

Accordingly, the object of the invention is further to develop the known cooling device in such a manner that it can be used also for goods which are subject to explosion.

This object is achieved by the invention in the manner that the conveyor worm is arranged on the outer surface of a cylindrical holow body which is closed at its ends, takes up the greatest part of the inside of the cooling device and is driven by the motor.

By this proposal in accordance with the invention there is obtained a substantial reduction in the space within which the explosive material can spread out,s o that in the ordinary case no explosive dust/air mixture can form. Should an explosion nevertheless occur, it is limited to small volumes so that it can be made harmless by a development of the cooling device which is resistant to pressure and to pressure surges.

By the invention it is furthermore proposed to coat the steel conveyor worm, at least on its possible surfaces of contact with the steel cooling jacket, with a nonsparking material so that the formation of sparks is prevented. In order to keep the damage to the cooling device as small as possible even in the event of the occurrence of explosions, it is furthermore proposed, in accordance with the invention, that the cylindrical cooling jacekt be provided on its housing lid, which closes off the top, with rupture disks or weight-loaded pressure flaps so that an excess pressure built up within the cooling device can be suitably relieved.

Finally, it is proposed by the invention that the cooling device be provided on its housing with inert-gas connections for the feeding of inert gas when a given oxygen concentrations is exceeded.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
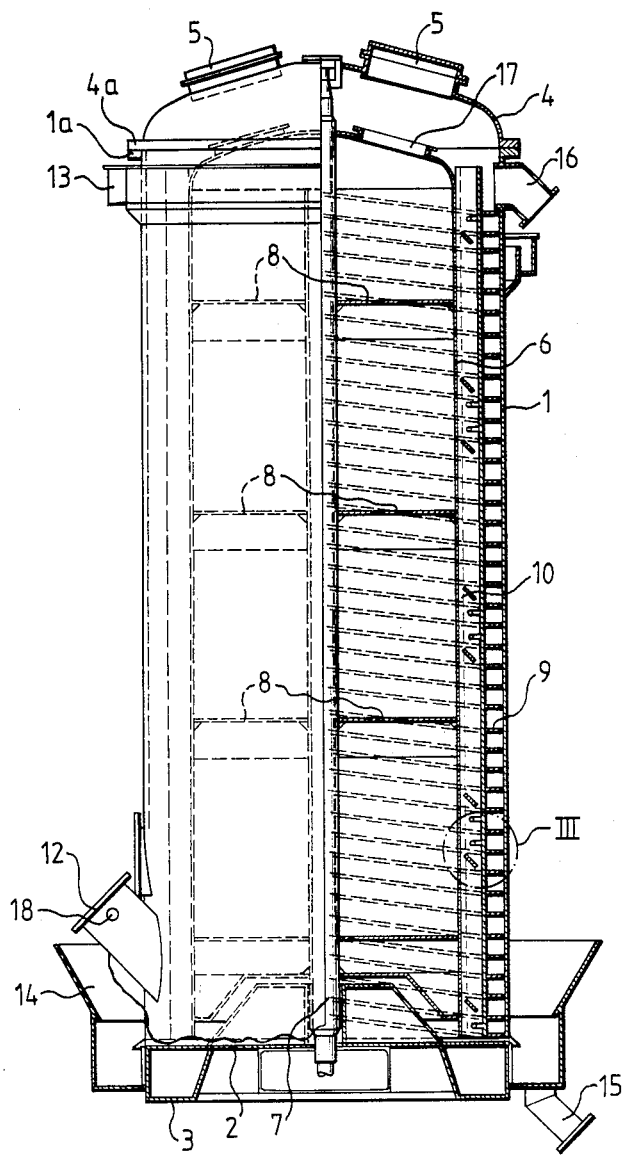
FIG. 1 is a side view of the cooling device shown half in vertical section.
Figure 2:
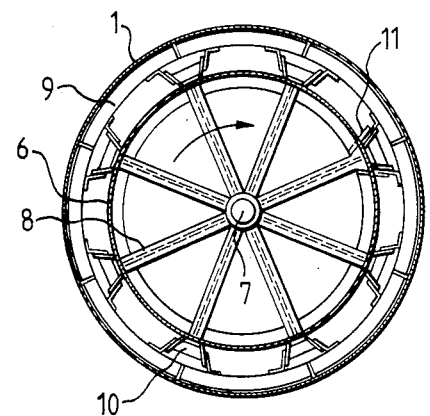
FIG. 2 is a horizontal section through the cooling device along the section line II—II of FIG. 1.

The device for the cooling of dust or finely granular bulk material comprises a vertical cylindrical cooling shell 1 which is closed at the bottom by a flat bottom 2 and stands on feet 3. The top of the cylindrical cooling shell 1 is closed by an arched housing lid 4 which, in the embodiment shown, is provided with two rupture disks 5 serving as rupture protection. In order to be able to remove the housing lid 4 from the cooling shell 1, these two parts are each provided with a flange ring 4a and 1a respectively.

Within the cooling shell 1 there is arranged a cylindrical hollow body 6 which is provided with a central shaft 7. This shaft 7 is not only connected on the top and bottom to the cylindrical hollow body 6 but also in the intermediate region by means of support spiders 8. The shaft 7 is turnably supported at both ends in the bottom 2 and the housing lid 4 of the cooling shell 1 respectively and is driven by a motor, not shown in the drawing.

Figure 3:
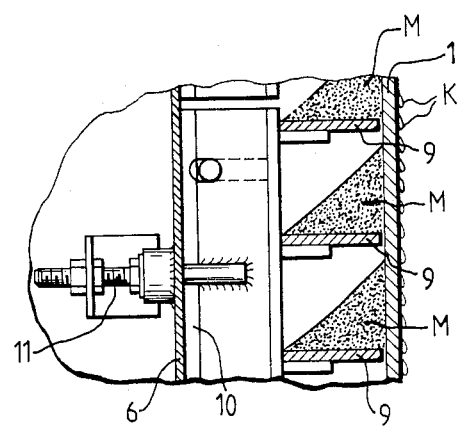
FIG. 3 shows a detail, on a larger scale, from the vertical section in accordance with the encircled region III of FIG. 1.

On the outside of the cylindrical hollow body 6 an annular conveyor worm 9 is arranged, the worm segments of which are arranged on the outside of bowl-shaped spars 10, as shown in detail in FIG. 3. These spars 10 are so adjustable in radial direction with respect to the cylindrical hollow body 6 that the circumferential surfaces of the conveyor worm 9 extend up to close to the inner wall of the cooling jacket 1. In FIG. 3 it can be noted that the spars 10 are displaceable continuously with respect to the hollow body 6 by means of a spindle 11.

On the bottom of the cooling jacekt 1 there is a material inlet 12 through which the material to be cooled is fed to the annular space between the inside of the stationary cooling jacet 1 and the outside of the rotating hollow body 6 or respectively of the spars 10 bearing the conveyor worm 9. By the rotation of the hollow body 6, the material M to be cooled is thrown, in accordance with FIG. 3, in the manner of a talus against the inner wall of the cooling jacekt 1 and at the same time transported upward. Heat is removed from the material M resting against the cooling jacket 1 in the manner that the cooling jacket 1 is acted on from the outsside by cooling fluid K, for instance water.

In the embodiment shown, the cooling fluid K is fed to an upper distributor ring 13 from which the cooling fluid K comes onto the outside of the cooling jacket 1 and flows down the latter in individual waves, as shown in FIG. 3. The cooling fluid K is collected at the bottom of the cooling jacket 1 by means of a collection ring 14 and is fed, via a cooling fluid outlet 15, to a recooling device, not shown in the drawing.

The material M cooled by the intimate contact with the externally cooled wall of the cooling jacket 1 is removed on the top of the cooling jacket 1 through a material outlet 16. In order to get into the inside of the hollow body 1, the hollow body is provided with a manhole 17 in the region of its cover in the embodiment shown.

By the arrangement of a cylindrical hollow body 6 within the cooling jacket 1 and the limiting of the volume acted on by the material M to be cooled to the annular space remaining between hollow body 6 and cooling jacket 1, the volume within which an explosive dust/air mixture can form is considerably reduced. By the feeding of inert gas, in particular in the event that a predetermined concentration of oxygen is exceeded, the danger of explosion can be completely excluded. For this purpose, the cooling jacket 1 is provided with several inert gas connections 18. Should a local explosion nevertheless occur, the rupture disks 5 or weight-loaded pressure flaps arranged in the housing lid 4 assure that no damage can occur to the pressure-surge resistant development of the cooling device, the pressure wave being discharged in suitable fashion out of the apparatus.

What is claimed:

1. In an apparatus for cooling explosive-prone dust or finely granular bulk material, having a vertical cylindrical cooling jacket, an externally cooled cylindrical surface of which is fed with the material to be cooled from inside of the cooling jacket by means of an annular continuous conveyor worm which conducts the material upward and which by sufficient rotation provides centrifugal force which presses the material against the cooled cylindrical surface consisting a heat exchange surface, the conveyor worm which is rotatable around a central axis being operatively rotatably driven by a motor so as to provide the sufficient rotation providing said centrifugal force, the improvement in the apparatus comprising
   a hollow body having a continuous cylindrical surface, the hollow body being closed at its ends and disposed inside the cooling jacket, and the conveyor worm is arranged on the continuous cylindrical surface of the cylindrical hollow body, the hollow body occupies the greatest part of the inside of the cooling jacket thereby defining therebetween a relatively small annular region, and is rotatably driven by the motor, and wherein
   the annular continuous conveyor worm is disposed inn said small annular region and is coated with a non-sparking material at least on a potential contact surface thereof facing the cooled cylindrical surface of the cooling jacket preventing sparks.

2. An apparatus according to claim 1, wherein
   the cooling jacket is provided with a housing lid which closes off its top with rupture disks or weight-loaded pressure flaps.

3. An apparatus according to claim 1, wherein
   the cooling jacket is provided with inert gas connections constituting means for feeding of inert gas should a given oxygen concentration be exceeded.

4. The apparatus according to claim 1, wherein
   said annular conveyor worm has a radial dimension which is very small compared with the radius of the cooling jacket.

5. An apparatus for cooling dust or finely granular bulk material, having a vertical cylindrical cooling jacket, an externally cooled cylindrical surface of which is fed with the material to be cooled from inside by means of an annular conveyor worm which conducts the material upward and by centrifugal force presses it against a heat exchange surface, the conveyor worm which is turnable around a central axis being driven by a motor, in combination with an improvement in the apparatus wherein
   the conveyor worm is arranged on a cylindrical surface of a cylindrical hollow body which is closed at its ends, the hollow body filling up the greatest part of inner space of the cooling jacket and is driven by the motor, the apparatus further comprising
   spar means for supporting said annular conveyor worm and being radially adjustably mounted on the cylindrical surface of said hollow body.

6. The apparatus according to claim 5, further comprising
   spindle means mounted on said hollow body and said spar means for radially adjusting said spar means.

7. The apparatus according to claim 5, wherein
   said spar means is jointly connected to said hollow body and to said annular conveyor worm for rotation by the motor rotating said hollow body.

8. The apparatus according to claim 1, wherein
   said hollow body includes a central shaft and a plurality of support spiders connecting said shaft with the cylindrical surface of said hollow body.

9. The apparatus according to claim 1, wherein
   the motor drives said annular conveyor worm with a high speed of rotation via said hollow body so as to provide said centrifugal force.

10. The apparatus according to claim 1, wherein
    said conveyor worm is made of steel.

11. The apparatus according to claim 8, wherein
    the motor drives said central shaft and thereby drives said annular conveyor worm via said central shaft, said support spiders and said hollow body.

* * * * *